US012072937B2

(12) United States Patent
Shang et al.

(10) Patent No.: US 12,072,937 B2
(45) Date of Patent: Aug. 27, 2024

(54) DATA READ METHOD, DATA UPDATE METHOD, ELECTRONIC DEVICE, AND PROGRAM PRODUCT

(71) Applicant: Dell Products L.P., Round Rock, TX (US)

(72) Inventors: Xiao Le Shang, Shanghai (CN); Xia Wang, Shanghai (CN); Xiangdong Huang, Shanghai (CN); Wesley Wei Sun, Shanghai (CN); Young Yangchun Wu, Shanghai (CN); Xin Li, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/065,569

(22) Filed: Dec. 13, 2022

(65) Prior Publication Data

US 2024/0111810 A1 Apr. 4, 2024

(30) Foreign Application Priority Data

Sep. 30, 2022 (CN) .......................... 202211215669.3

(51) Int. Cl.
*G06F 16/901* (2019.01)
*H04L 41/14* (2022.01)

(52) U.S. Cl.
CPC ........ *G06F 16/9027* (2019.01); *H04L 41/145* (2013.01)

(58) Field of Classification Search
CPC ........................... G06F 16/9027; H04L 41/145
USPC .......................................................... 707/797
See application file for complete search history.

(56) References Cited

U.S. PATENT DOCUMENTS

| | | | |
|---|---|---|---|
| 2010/0042824 A1* | 2/2010 | Lee ........................ | H04L 9/0894 713/168 |
| 2011/0029496 A1* | 2/2011 | Flynn ..................... | G06F 3/0659 707/696 |
| 2013/0018854 A1* | 1/2013 | Condict ................. | G06F 3/0608 707/E17.002 |
| 2014/0331011 A1* | 11/2014 | Kesavan ................. | G06F 3/067 711/162 |
| 2015/0262064 A1* | 9/2015 | Burger .............. | G06F 16/90335 706/46 |
| 2022/0247816 A1* | 8/2022 | Ghatage .............. | H04L 67/1097 |

* cited by examiner

*Primary Examiner* — Hosain T Alam
*Assistant Examiner* — Saba Ahmed
(74) *Attorney, Agent, or Firm* — Amin, Turocy & Watson, LLP

(57) ABSTRACT

Data reads and related data reading processes are described. An example data read method includes: receiving a data read request, the data read request being aimed at target node data stored in a target node of a B+ tree; acquiring node location information, the node location information indicating a storage location of node data in a node data set of the B+ tree, and the node data set including the target node data; and determining a target storage location of the target node data. Beneficially, data stored in the B+ tree can be read and updated efficiently while reducing computing overhead.

20 Claims, 5 Drawing Sheets

DATA READ METHOD, DATA UPDATE METHOD, ELECTRONIC DEVICE, AND PROGRAM PRODUCT

RELATED APPLICATION

The present application claims the benefit of priority to Chinese Patent Application No. 202211215669.3, filed on Sep. 30, 2022, which application is hereby incorporated into the present application by reference herein in its entirety.

TECHNICAL FIELD

Embodiments of the present disclosure generally relate to computer technologies, and in particular, to a data read method, a data update method, an electronic device, and a computer program product that can be used, for example, in an elastic cloud environment and a B+ tree storage environment.

BACKGROUND

A cloud service such as Elastic Cloud Storage (ECS) is an object storage service. Such object storage service includes a part for storing data and a part for storing elements, wherein the elements may include special components such as metadata. The elastic cloud storage uses a so-called directory table service to store various types of metadata, and the directory table service has predefined partitions divided by a consistent hashing process. These partitions are evenly distributed across cluster nodes.

Partitioning is a customized log-structured merge (LSM) tree implementation, which may include three parts, for example, a log, a storage table, and a persistent append-only B+ tree on a disk. The directory table may be equivalent to a repository of the B+ tree. When data, such as key-value pairs, is to be stored, a log thereof may be stored first, and then a user is prompted that the data has been stored. At this time, a next step may be performed to achieve the best write performance. A backend of elastic cloud storage will store data orderly on a B+ tree, and the B+ tree will eventually be stored on a hard disk. Since the last stored data is most likely to be accessed by the user, it may be cached in a storage table, and the data in the storage table may be written to a B+ tree when the backend has an opportunity.

Searching for or updating entries in a B+ tree in the elastic cloud storage, such as the append-only B+ tree, involves many workloads such as searching, comparison, data deserialization, and data serialization. Most of the workloads are operations bound by a central processing unit (CPU). In particular, when operating on a small S3 object of, for example, less than 100 KB, metadata processing becomes the major factor affecting the system performance. However, the existing storage and update operations for an append-only B+ tree have problems of high overhead and low efficiency.

SUMMARY

Embodiments of the present disclosure provide a data read method, a data update method, an electronic device, and a computer program product.

In a first example embodiment of the present disclosure, a data read method is provided. The method includes: receiving a data read request, the data read request being aimed at target node data stored in a target node of a B+ tree; acquiring node location information, the node location information indicating a storage location of node data in a node data set of the B+ tree, and the node data set including the target node data; and determining a target storage location of the target node data.

In a second example embodiment of the present disclosure, a data update method is provided. The method includes: receiving update data, the update data being aimed at target node data stored in a target node of a B+ tree; acquiring node location information, the node location information indicating a storage location of node data in a node data set of the B+ tree, and the node data set including the target node data; determining a target storage location of the target node data based on the update data; and updating the target node data by using the update data.

In a third example embodiment of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions comprising: receiving a data read request, the data read request being aimed at target node data stored in a target node of a B+ tree; acquiring node location information, the node location information indicating a storage location of node data in a node data set of the B+ tree, and the node data set including the target node data; and determining a target storage location of the target node data.

In a fourth example embodiment of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions comprising: receiving update data, the update data being aimed at target node data stored in a target node of a B+ tree; acquiring node location information, the node location information indicating a storage location of node data in a node data set of the B+ tree, and the node data set including the target node data; determining a target storage location of the target node data based on the update data; and updating the target node data by using the update data.

In a fifth example embodiment of the present disclosure, a computer program product is provided. The computer program product is tangibly stored on a non-transitory computer-readable medium and includes machine-executable instructions, wherein the machine-executable instructions, when executed, cause a machine to operations, comprising: receiving a data read request, the data read request being aimed at target node data stored in a target node of a B+ tree; acquiring node location information, the node location information indicating a storage location of node data in a node data set of the B+ tree, and the node data set including the target node data; and determining a target storage location of the target node data.

In a sixth example embodiment of the present disclosure, a computer program product is provided. The computer program product is tangibly stored on a non-transitory computer-readable medium and includes machine-executable instructions that, when executed, cause a machine to perform operations, comprising: receiving update data, the update data being aimed at target node data stored in a target node of a B+ tree; acquiring node location information, the node location information indicating a storage location of node data in a node data set of the B+ tree, and the node data set including the target node data; determining a target storage location of the target node data based on the update data; and updating the target node data by using the update data.

The Summary part is provided to introduce the selection of concepts in a simplified form, which will be further described in the Detailed Description below. The Summary part is neither intended to identify key features or essential features of the embodiments of the present disclosure, nor intended to limit the scope of the embodiments of the present disclosure.

BRIEF DESCRIPTION OF THE DRAWINGS

The above and other objectives, features, and advantages of the present disclosure will become more apparent by describing example embodiments of the present disclosure in more detail in combination with the accompanying drawings. In the example embodiments of the present disclosure, the same reference numerals generally represent the same parts.

In the drawings, identical or corresponding numerals represent identical or corresponding parts.

DETAILED DESCRIPTION

Figure 1:
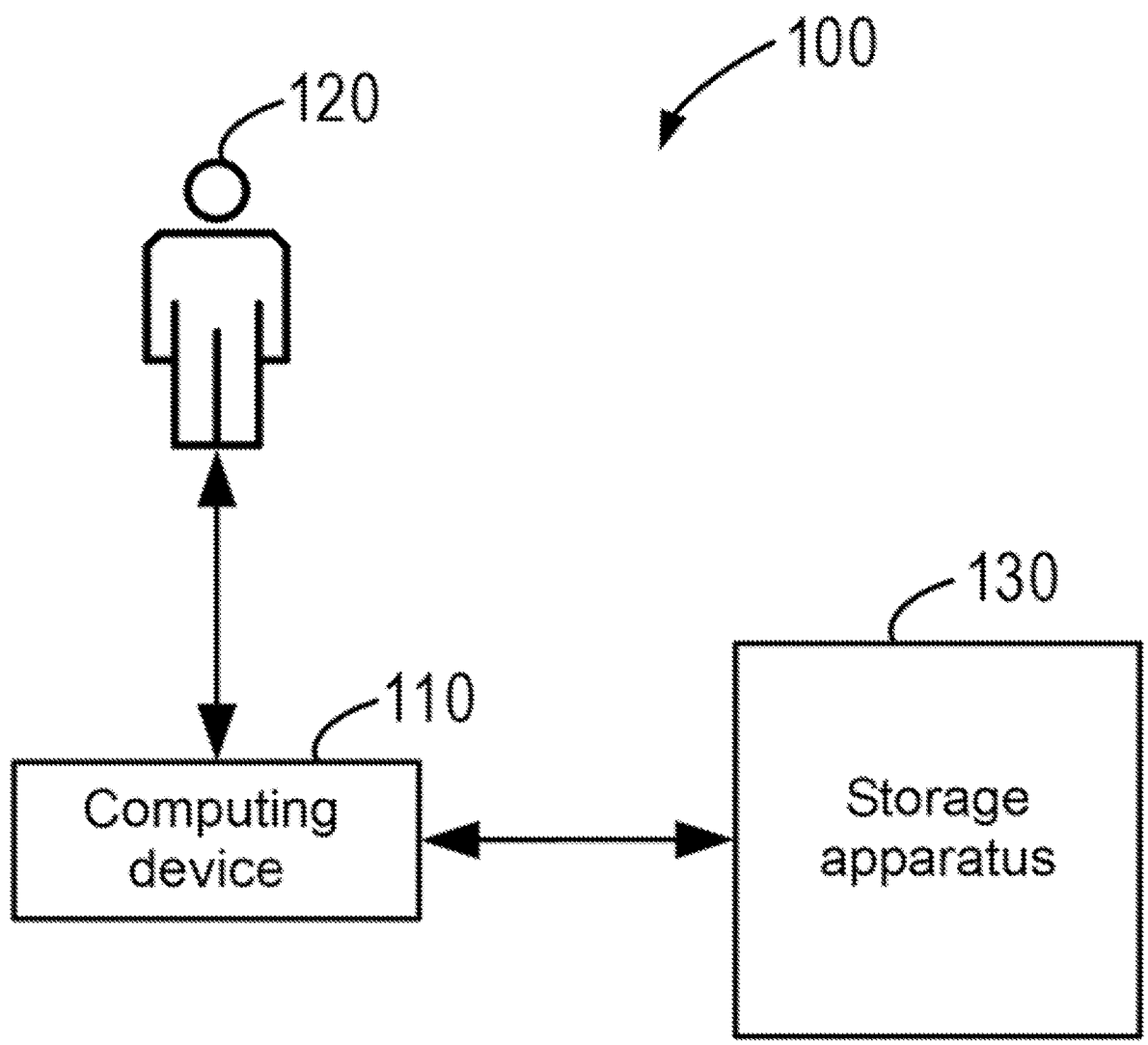
FIG. 1 is a schematic diagram of data processing environment in which a device and/or method according to an embodiment of the present disclosure may be implemented.

Example embodiments of the present disclosure will be described in more detail below with reference to the accompanying drawings. Although example embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

As described in the background above, the existing storage and update operations for an append-only B+ tree have the problems of high overhead and low efficiency. For example, in a conventional append-only B+ tree structure, the B+ tree structure is stored in a disk, where each root node, each index node, and each leaf node of the B+ tree structure are stored at different disk locations, and only leaf nodes store data such as key-value pairs, while other nodes mainly store index entries. An index entry indicates, for example, how to index from a root node to an index node, and then to a leaf node.

For example, in a conventional append-only B+ tree structure, searching for keys in key-value pairs may include the following steps:

Step 1: Acquire a location of a root page corresponding to a root node.
Step 2: Read and decompress the root page from a disk.
Step 3: Deserialize the root page into a storage structure containing key-value pairs.
Step 4: Perform a binary search in the storage structure to find a location of a next level page.
Step 5: Loop back to step 2 until a page corresponding to node data is obtained.
Step 6: Return to a key-value pair stored in a leaf page.

When searching for key-value pairs in a conventional append-only B+ tree structure as described above, even if binary search takes the time of $O(\log N)$ to search for keys, the deserialization step does not need such time. Different from a key-value system using simple binary ordered key representation or column storage, elastic cloud storage uses a conventional Google Protocol Buffer (GPB) coded key representation and node page structure. In order to restore a page containing M key-value pairs to a key-value pair representation in a memory, the required time complexity is $O(M*L)$, and the space complexity is also $O(M*L)$, where L is the complexity or space when restoring a key-value pair to a storage representation.

After a B+ tree page corresponding to a B+ tree node is decoded into a page buffer structure in the memory, these key-value pairs will be stored in an immutable list and referenced by pointers. In order to search in a list, many pointer dereference operations will be involved, and the processing of a cache memory location will also face tedious operations.

As can be seen, when searching for key-value pairs in a conventional append-only B+ tree structure as described above, there are problems of high overhead and low efficiency.

For another example, in a conventional append-only B+ tree structure, updating key-value pairs requires the same steps as those in searching for and locating keys in a leaf page, which may specifically include the following steps:

Step 1: Update a list of key-value pairs in a page buffer in the memory.
Step 2: Serialize the page buffer into a new encoded B+ tree page.
Step 3: Compress the B+ tree pages and append them to new locations in batches.
Step 4: If necessary, update a parent index page thereof.

When updating the key-value pairs in the conventional append-only B+ tree structure as described above, even if only a single key-value pair needs to be updated, all B+ tree pages need to be encoded again, which is also $O(M)$ operations.

As can be seen, when updating the key-value pairs in the conventional append-only B+ tree structure as described above, there are also problems of high overhead and low efficiency.

In order to at least partially solve one or more of the above problems and other potential problems, the embodiments of the present disclosure propose a novel solution, which mainly involves unified storage of key-value pairs in a B+ tree structure by, for example, merging them into a single original pair of data blocks, and introducing, for example, node location information indicating a location offset of each leaf node in the B+ tree structure relative to reference node data, for example, an offset array.

FIG. 1 is a schematic block diagram of data processing environment 100 in which a device and/or method according to an embodiment of the present disclosure can be implemented. According to an embodiment of the present disclosure, data processing environment 100 may be a cloud environment.

As shown in FIG. 1, data processing environment 100 includes computing device 110 and storage apparatus 130. For example, storage apparatus 130 stores data such as key-value pairs in the form of B+ tree structure such as an append-only B+ tree. Computing device 110 may interact with user 120 to acquire from user 120 a data read request for reading node data stored in storage apparatus 130, acquire from user 120 update data for updating the node data stored in storage apparatus 130, and provide user 120 with various types of feedback information for data reading and data updating.

According to this example embodiment of the present disclosure, when the targeted append-only B+ tree node is a root node or an index node, the node data may include index entries of child nodes of the target node, and when the targeted append-only B+ tree node is a leaf node, the node data may include, for example, user data in the form of key-value pairs.

Figure 2:
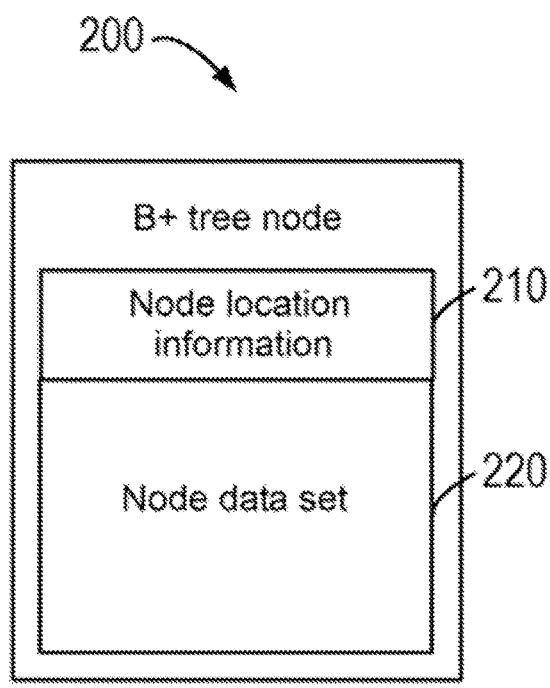
FIG. 2 is a schematic diagram of B+ tree node according to an embodiment of the present disclosure.

FIG. 2 is a schematic diagram of B+ tree node 200 according to an embodiment of the present disclosure. According to this example embodiment of the present disclosure, B+ tree node 200 may be a B+ tree page corresponding to a node in an append-only B+ tree when storage apparatus 130 stores key-value pairs in the form of an append-only B+ tree structure.

As shown in FIG. 2, B+ tree node 200 includes node location information 210 and node data set 220. According to this example embodiment of the present disclosure, node data set 220 may be, for example, a set of all node data stored in the append-only B+ tree to store key-value pairs, and node location information 210 may indicate storage locations of the node data in the node data set of the B+ tree. According to an embodiment of the present disclosure, node location information 210 may indicate a storage location offset of the node data in node data set 220 relative to reference node data, such as the first piece of node data, in the node data set. For example, an offset array PagePairOffsetArray may be used.

Figure 3:
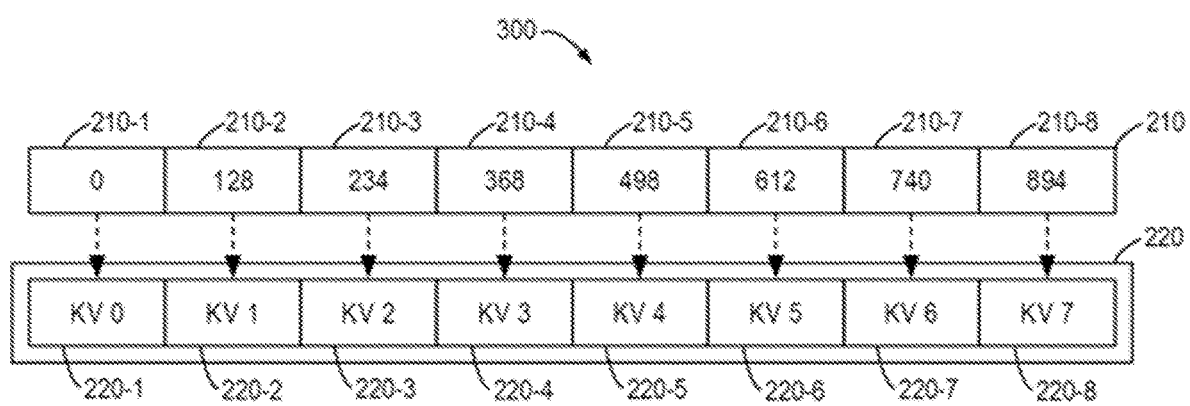
FIG. 3 is a schematic diagram of leaf node storage structure according to an embodiment of the present disclosure.

FIG. 3 is a schematic diagram of leaf node storage structure 300 according to an embodiment of the present disclosure. As shown in FIG. 3, leaf node storage structure 300 also includes node location information 210 and node data set 220, wherein node location information 210 includes, for example, storage location offsets 210-1, 210-2, 210-3, 210-4, 210-5, 210-6, 210-7, and 210-8 for eight pieces of node data, whose values are 0, 128, 234, 368, 498, 612, 740, and 894, respectively. Meanwhile, node data set 220 includes, for example, eight pieces of node data 220-1, 220-2, 220-3, 220-4, 220-5, 220-6, 220-7, and 220-8 corresponding to the storage location offsets 210-1, 210-2, 210-3, 210-4, 210-5, 210-6, 210-7, and 210-8 of the eight pieces of node data. It should be noted that in the example in FIG. 3, first piece of node data 220-1 is used as reference node data, and therefore, the value of storage location offset 210-1 corresponding to first piece of node data 220-1 is 0.

Figure 4:
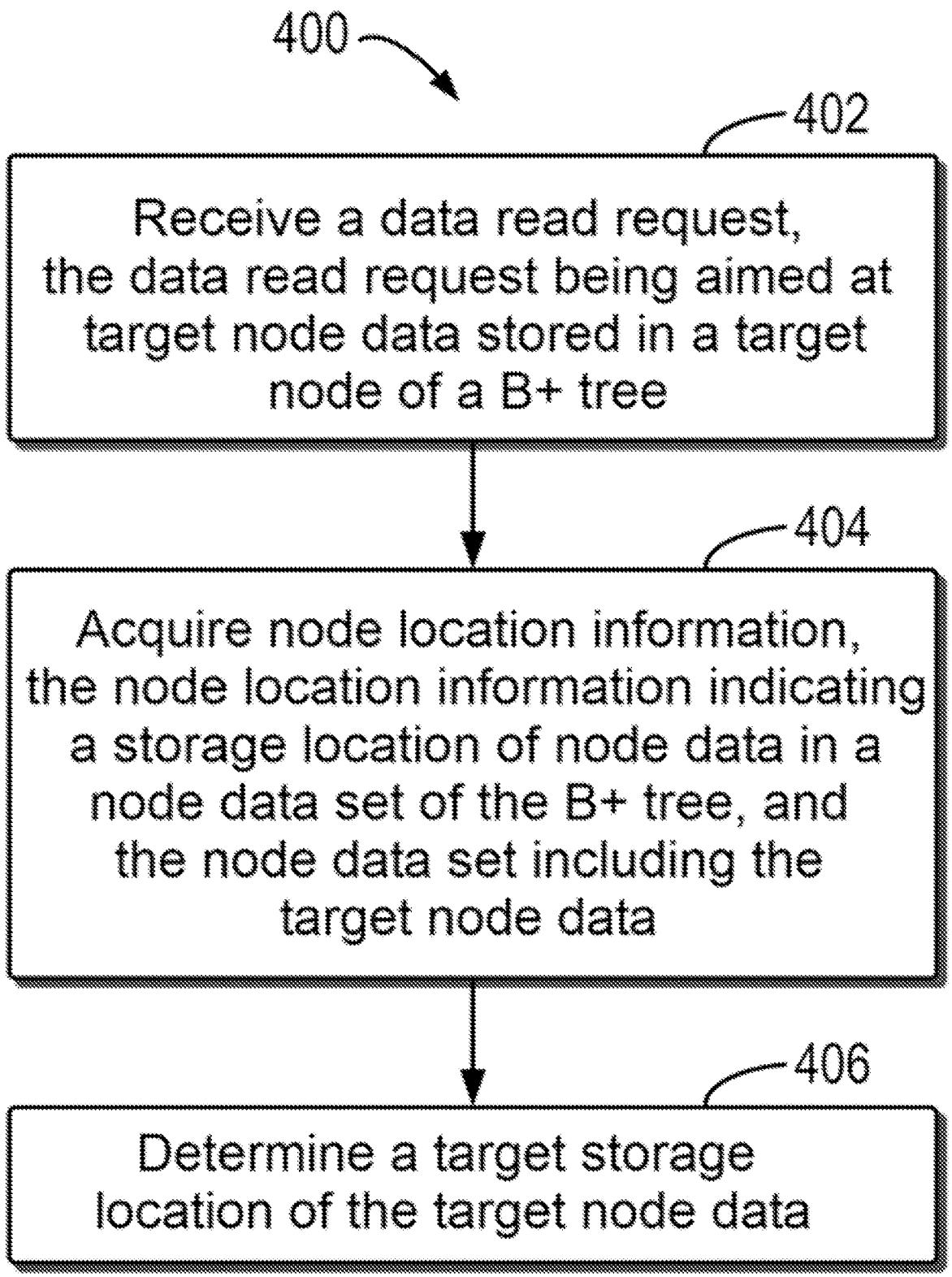
FIG. 4 is a flow chart of data read method according to an embodiment of the present disclosure.

FIG. 4 shows a flow chart of data read method 400 according to an embodiment of the present disclosure. Method 400 may be implemented by computing device 110 shown in FIG. 1, or by other appropriate devices. It should be understood that data storage method 400 may also include additional steps not shown and/or may omit the steps shown, and the scope of the embodiments of the present disclosure is not limited in this regard.

At block 402, computing device 110 receives a data read request. According to this example embodiment of the present disclosure, the data read request is aimed at target node data stored in a target node of a B+ tree.

According to this example embodiment of the present disclosure, the data read request may include a key of target node data in the form of a key-value pair.

At block 404, computing device 110 acquires node location information 210. According to this example embodiment of the present disclosure, node location information 210 indicates a storage location of node data in node data set 220 of the B+ tree, and node data set 220 includes the target node data.

According to some embodiments of the present disclosure, node location information 210 may indicate a specific storage location of the node data in node data set 220.

According to some other embodiments of the present disclosure, node location information 210 may indicate a storage location offset of the node data in node data set 220 relative to reference node data in the node data set. Taking FIG. 3 as an example, the storage location offset of node data 220-3 relative to node data 220-1 as the reference node data is 234.

According to this example embodiment of the present disclosure, at least a part of the node data stored in node data set 220 may be stored in the form of packaged data blocks. For example, they are stored as original pair data blocks. In particular, all node data stored in node data set 220 are stored in the form of packaged data blocks.

At block 406, computing device 110 determines a target storage location of the target node data. According to this example embodiment of the present disclosure, computing device 110 may determine the target storage location of the target node data through node location information 210.

According to this example embodiment of the present disclosure, computing device 110 may determine the target storage location by using a binary search method based on acquired node location information 210 and based on, for example, the key of the target node data in the form of a key-value pair. The binary search method may start from an N/2 index position, and then perform comparison with key pairs at N/4 and N3/4 positions. Therefore, when the target storage location is being determined, a parsing step may be completed by processing node location information 210 without contacting original data of the key-value pair. Then, the required key-value pair may be read according to the target storage location in the form of, for example, an offset determined by the binary search method. Therefore, the complexity of the parsing step in time and space is reduced from O(N) to O(1).

Leaf node storage structure 300 shown in FIG. 3 is used as an example. Assuming that the target storage location is the storage location of node data 220-2, when the binary search method is used, the computing device may use node location information 210 to first locate node data 220-5, then locate node data 220-3, and finally locate node data 220-2 to obtain the storage location of node data 220-2.

As can be seen, the binary search method only needs to contact node location information 210 corresponding to the key-value pair for Log N times to complete the search. As can be seen, by using the page structure of B+ tree node 200, once node location information 210 is acquired, the location of each key-value pair may be easily determined:

a location of pair (k)=the (k)th element in node location information 210 as an offset array As mentioned before, data storage method 400 may also include additional steps not shown and/or may omit the steps shown.

According to some embodiments of the present disclosure, after determining the target storage location of the target node data, computing device 110 may further determine whether the target node data is stored in a least recently used cache, and when determining that the target node data is stored in the least recently used cache, the computing device may directly read the target node data from the least recently used cache. This is because, according to this example embodiment of the present disclosure, if some data is frequently used, the data may be stored in a least recently used cache. At this point, the data may be directly read from the least recently used cache, which not only can simplify the operation, but also can speed up the reading process.

According to some other embodiments of the present disclosure, after determining the target storage location of the target node data, computing device 110 may first read the target node data from the target storage location, and then determine whether a difference between a layer of the B+ tree where the target node is located and a layer where a root node of the B+ tree is located is less than a threshold number of layers. If the difference between the layer of the B+ tree where the target node is located and the layer where the root node of the B+ tree is located is less than the threshold number of layers, the target node data is stored in the least recently used cache. With this operation, the frequently used data may be stored in the least recently used cache, so that when these data are used again, they may be directly read from the least recently used cache.

According to still other embodiments of the present disclosure, after determining the target storage location of the target node data, computing device 110 may first read the target node data from the target storage location, and then determine whether the number of reads of the target node data is greater than a threshold number. If the number of reads of the target node data is greater than the threshold number, the target node data is stored in the least recently used cache. With this operation, the frequently used data may also be stored in the least recently used cache, so that when these data are used again, they may be directly read from the least recently used cache.

In addition, according to this example embodiment of the present disclosure, when a plurality of pieces of target node data are stored in a least recently used cache, they may be sequenced according to frequencies of use in the form of a queue, so that the target node data that is more frequently used may be easily read from the least recently used cache.

Figure 5:
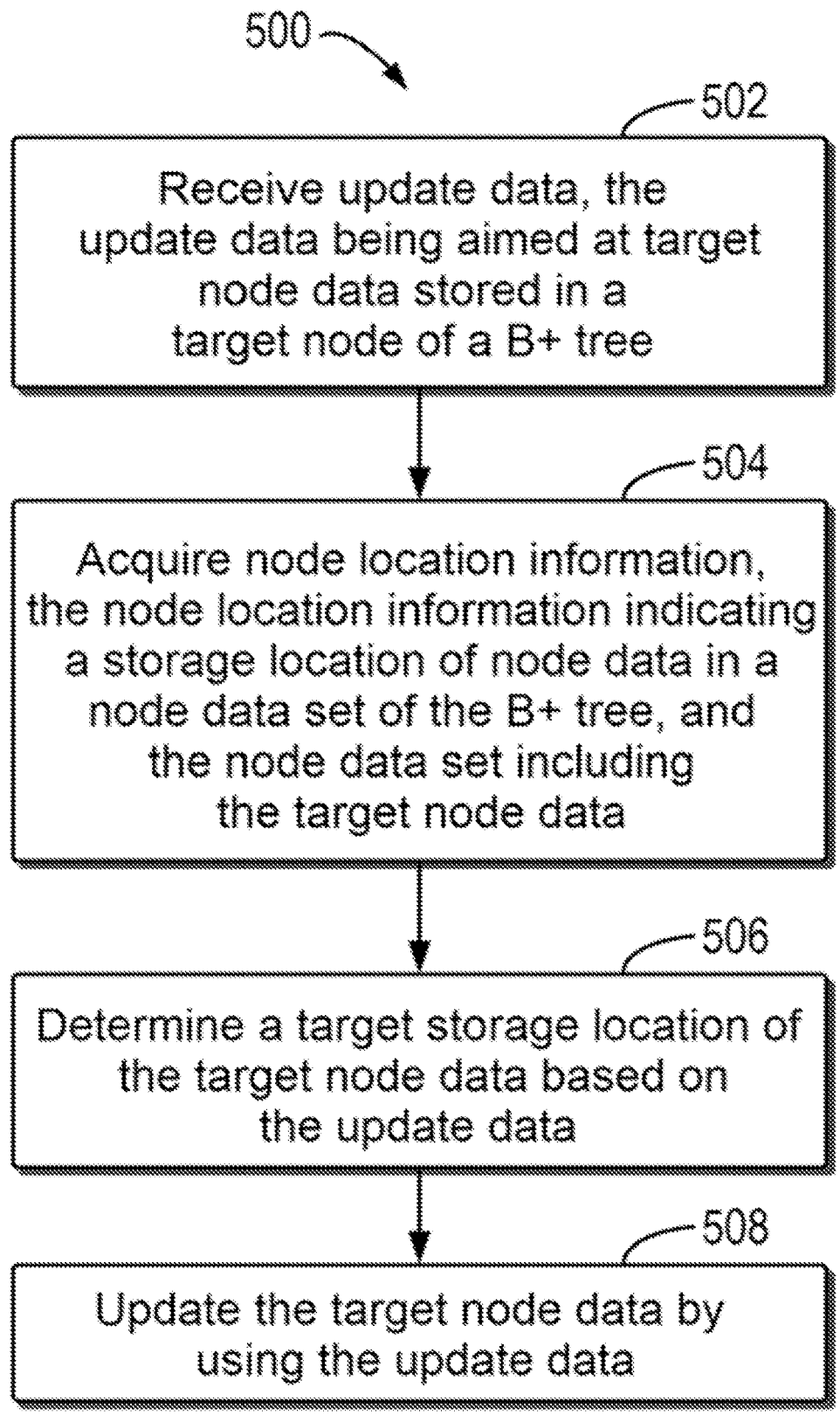
FIG. 5 is a flow chart of data update method according to an embodiment of the present disclosure.

FIG. 5 is a flow chart of data update method 500 according to an embodiment of the present disclosure. Method 500 may be implemented by computing device 110 shown in FIG. 1, or by other appropriate devices. It should be understood that data update method 500 may also include additional steps not shown and/or may omit the steps shown, and the scope of the embodiments of the present disclosure is not limited in this regard.

At block 502, computing device 110 receives update data. According to some embodiments of the present disclosure, the update data is aimed at target node data stored in a target node of a B+ tree. According to some other embodiments of the present disclosure, the update data is not aimed at target node data stored in a target node of a B+ tree, but may be directly added to node data in the B+ tree.

At block 504, computing device 110 acquires node location information. According to this example embodiment of the present disclosure, the node location information indicates a storage location of node data in a node data set of the B+ tree, and the node data set includes the target node data.

According to some embodiments of the present disclosure, node location information 210 may indicate a specific storage location of the node data in node data set 220.

According to some other embodiments of the present disclosure, node location information 210 may indicate a storage location offset of the node data in node data set 220 relative to reference node data in the node data set. Taking FIG. 3 as an example, a storage location offset of node data 220-4 relative to node data 220-1 as the reference node data is 368.

According to this example embodiment of the present disclosure, at least a part of the node data stored in node data set 220 may be stored in the form of packaged data blocks. For example, they are stored as original pair data blocks. In particular, all node data stored in node data set 220 are stored in the form of packaged data blocks.

At block 506, computing device 110 determines a target storage location of the target node data based on the update data.

According to this example embodiment of the present disclosure, computing device 110 may determine the target storage location of the target node data based on acquired node location information 210 and based on, for example, a key of the update data in the form of a key-value pair.

At block 508, computing device 110 updates the target node data by using the update data.

According to some embodiments of the present disclosure, computing device 110 may remove, by storing the update data in updated node data of the B+ tree, the target node data from node data set 220 and add the updated node data to form updated node data set 220. This is because when the append-only B+ tree is used, it is not supported to directly change existing node data, but needs to update node data set 220 by adding the updated node data.

It should be understood that data storage method 500 may also include additional steps not shown and/or may omit the steps shown.

According to some embodiments of the present disclosure, after updating the target node data with the update data, computing device 110 may update the node location information based on the storage location of the updated node data.

According to an embodiment of the present disclosure, when a user updates the target node data in a page, such as a key-value pair, a virtual key-value pair may be represented by using, for example, a RoIndexPair data structure, which includes, for example, an offset of the key-value pair in node data set 220 that may be original data. Some code for updating the page by using RoIndexPair may be as follows:

```
RoIndexPair implements IndexPair{
    Byte [ ] byteArray;
    Int startOff;
    Int length;
    Key getKey( ){return deserialKey(byteArray, startOff, length);}
    KeyValue getKeyValue( ) {return deserialKeyValue(byteArray, startOff, length);}
    ByteBuf getByteBuf( ){return new ByteBuf(byteArray, startOff, length);}
}
```

When RoIndexPair is updated, RwIndexPair may be introduced to track changes with updated values, instead of modifying a binary page. Some code for updating the page by using RwIndexPair may be as follows:

```
RwIndexPair implements IndexPair{
  Key;
  Value;
  Key getKey( ){return key;}
  KeyValue getKeyValue( ){return new KeyValue(key, value)}
  ByteBuf getByteBuf( ){return ByteBuf.wrap(getKeyValue( ).toBytes(
    ));}
}
```

At this point, when serializing the page buffer PageBuffer to a new page, it is easy to identify an unmodified key-value pair, and original data may be directly packaged from a source page to a target page without encoding the key-value pair again. Specifically, the unmodified key-value pair may be directly copied to the new page, while the modified key-value pair may be written to the new page after serialized. Therefore, with the embodiments of the present disclosure, it is unnecessary to perform append or repeated operations on the unmodified key-value pair. As can be seen, by using the embodiments of the present disclosure, a lot of resources required for updating pages can be saved.

Data processing environment 100 in which the devices and/or the methods according to embodiments of the present disclosure may be implemented, B+ tree node surface 200 according to an embodiment of the present disclosure, leaf node storage structure 300 according to an embodiment of the present disclosure, data read method 400 according to an embodiment of the present disclosure, and data update method 500 according to an embodiment of the present disclosure are described above with reference to FIG. 1 to FIG. 5. It should be understood that the above description is to better demonstrate the content recorded in the embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes may be arbitrarily set as needed without affecting the normal implementation of the embodiments of the present disclosure.

Through the above description with reference to FIG. 1 to FIG. 5, according to the technical solution of the embodiments of the present disclosure, data stored in a B+ tree may be efficiently read and updated while reducing the computational overhead.

Specifically, the technical solution according to the embodiments of the present disclosure introduces a new data read and update method based on changes in a data structure such as a B+ tree node storage structure. By adopting the technical solution according to the embodiments of the present disclosure, the speed of parsing and updating B+ tree nodes may be improved, and accurate binary search may be performed instead of extensive parsing and search. In addition, by using the technical solution according to the embodiments of the present disclosure, the use of the central processing unit and the cache memory when accessing the page may be reduced. Further, adopting the technical solution according to the embodiments of the present disclosure may reduce the complexity in time and space when reading and updating the data stored in the B+ tree, and is particularly conducive to virtual machine-based applications.

With the technical solution according to the embodiments of the present disclosure, in terms of simple page deserialization, when an append-only B+ tree node stores data of, for example, 1000 key-value pairs, the time required for deserialization of this B+ tree node may be reduced from 600 μs to 2 μs, which is equivalent to saving more than 99% of the deserialization time.

With the technical solution according to the embodiments of the present disclosure, in terms of simple page update, when an append-only B+ tree node stores data of, for example, 1000 key-value pairs, the time required to update the key-value pairs of this B+ tree node may be reduced from 942 μs to 69 μs, which is equivalent to saving more than 93% of the deserialization time.

With the technical solution according to the embodiments of the present disclosure, when 10 k small S3 objects are being created, the number of operations per second per node may be increased from 15000 to 16300, with an increase of 8.6%.

With the technical solution according to the embodiments of this disclosure, when 10 k small S3 objects are read, the number of operations per second per node may be increased from 35000 to 45000, with an increase of 28.7%.

Figure 6:
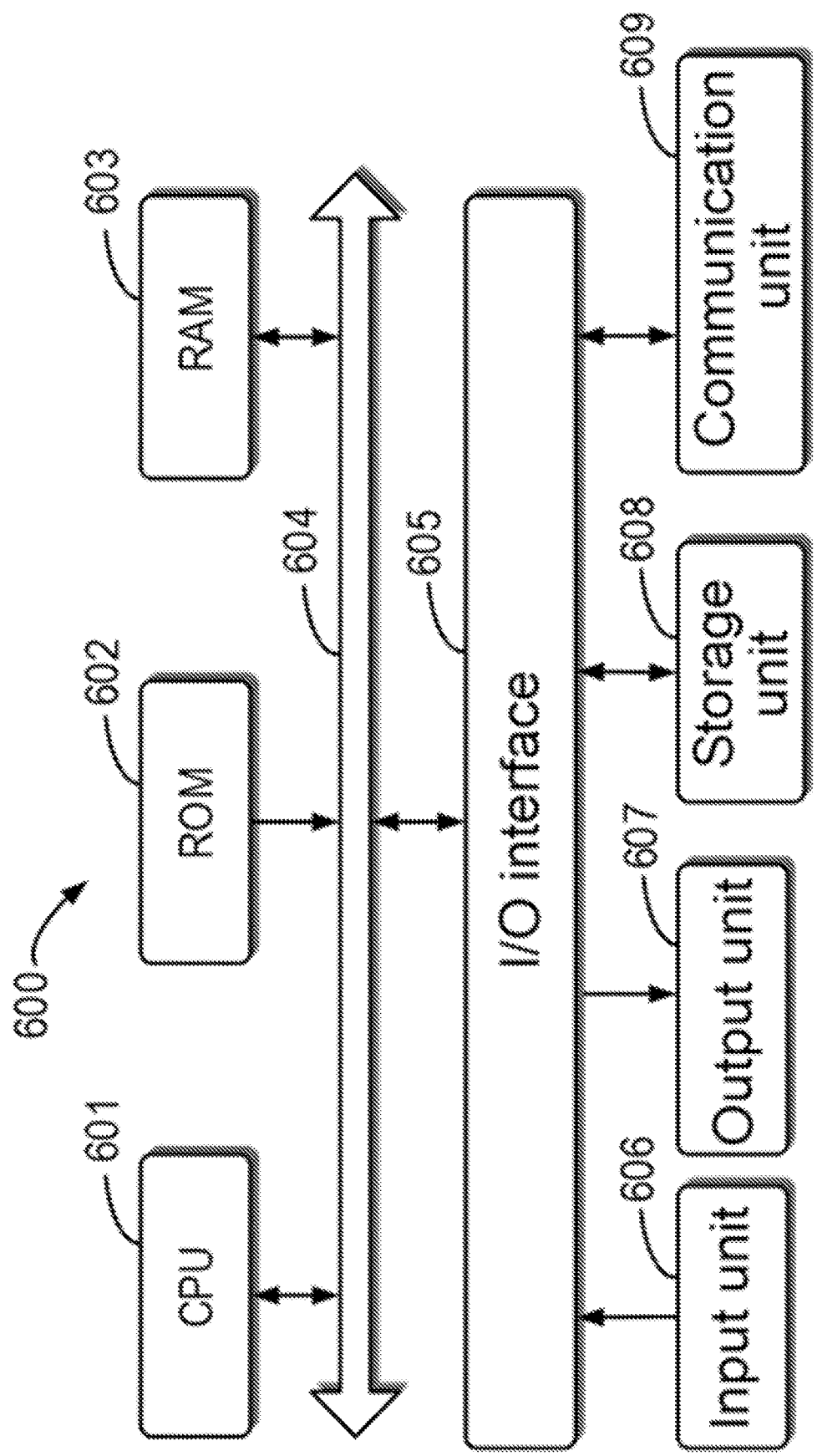
FIG. 6 is a schematic block diagram of example device that may be used to implement embodiments of the present disclosure.

FIG. 6 is a schematic block diagram of example device 600 that may be used to implement embodiments of the present disclosure. According to an embodiment of the present disclosure, computing device 110 in FIG. 1 may be implemented by device 600. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. In RAM 603, various programs and data required for the operation of device 600 may also be stored. CPU 601, ROM 602, and RAM 603 are connected to each other through bus 604. Input/output (I/O) interface 606 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as methods 400 and 500, may be performed by processing unit 601. For example, in some embodiments, methods 400 and 500 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded to RAM 603 and executed by CPU 601, one or more actions of methods 400 and 500 described above may be executed.

The embodiments of the present disclosure may relate to a method, a device, a system, and/or a computer program product. The computer program product may include a computer-readable storage medium on which computer-readable program instructions for performing various aspects of the embodiments of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples of the computer-readable storage medium as a non-exhaustive list include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to the user computer over any kind of networks, including a local area network (LAN) or a wide area network (WAN), or may be connected to the external computer, for example, through the Internet by using an Internet service provider. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the embodiments of the present disclosure.

Various aspects of the embodiments of the present disclosure are described here with reference to the flow charts and/or block diagrams of the method, the device/system, and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

What is claimed is:

1. A method, comprising:
    generating, by a system comprising at least one processor, a B+ tree structure for an append-only B+ tree, wherein the append-only B+ tree comprises nodes, wherein a subset of the nodes comprises leaf nodes that comprise data, the data comprising respective key-value pairs, and wherein the B+ tree structure comprises:
        a single data block that comprises the key-value pairs respectively associated with the leaf nodes of the append-only B+ tree, and
        a node location information array that specifies respective offsets of locations of the key-value pairs in the single data block relative to a reference location of the single data block;
    receiving, by the system, a data read request for a data read, the data read request comprising a key associated with target node data stored in a target leaf node of the append-only B+ tree; and
    based on the node location information and the key, identifying, by the system, using the respective offsets to perform a binary search of the single data block, a location of a key-value pair associated with the target node data.

2. The method of claim 1, wherein the nodes of the append-only B+ tree further comprise a root node and index nodes.

3. The method of claim 1, wherein the index nodes comprise index entries that define how to index from the root node to the index nodes to the leaf nodes.

4. The method of claim 1, wherein the root node, the index nodes, and the leaf nodes are stored across distributed storage nodes.

5. The method of claim 1, further comprising:
    reading, in response to a determination that the target node data is stored in a cache, the target node data from the cache.

6. The method of claim 1, further comprising:
    reading the target node data from a target storage location of the target node data; and
    storing, in response to a determination that a difference between a layer of the B+ tree where the target leaf node is located and a layer where the root node of the B+ tree is located is less than a threshold number of layers, the target node data in a cache.

7. The method of claim 1, further comprising:
    reading the target node data from a target storage location of the target node data; and
    storing, in response to a determination that a number of reads of the target node data is greater than a threshold number, the target node data in a cache.

8. The method of claim 1, wherein the key is a first key, the target node data is a first target node data, the target leaf node is a first target leaf node, the location is a first location, the key-value pair is a first key-value pair, and further comprising:
    receiving, by the system, an update request comprising a second key and update data, wherein the second key is associated with second target node data stored in second target leaf node of the append-only B+ tree, and the update data applicable to a data update for the second target node data;
    based on the node location information and the second key, identifying, by the system, using the respective offsets to perform another binary search of the single data block, a second location of a second key-value pair associated with the second target node data; and
    updating, by the system, the second target node data using the update data.

9. A system, comprising:
    a processor; and
    a memory, coupled to the processor, that stores executable instructions that, when executed by the processor, facilitate performance of operations, comprising:
        generating a B+ tree structure for an append-only B+ tree, wherein the append-only B+ tree comprises nodes, wherein a subset of the nodes comprises leaf nodes that comprise data, the data comprising respective key-value pairs, and wherein the B+ tree structure comprises:
            a single data block that comprises the key-value pairs respectively associated with the leaf nodes of the append-only B+ tree, and
            a node location information array that specifies respective offsets of locations of the key-value pairs in the single data block relative to a reference location of the single data block;
        receiving a data read request for a data read, the data read request comprising a key associated with target node data stored in a target leaf node of the append-only B+ tree; and
        based on the node location information and the key, identifying using the respective offsets to perform a binary search of the single data block in the memory, a location of a key-value pair associated with the target node data.

10. The system of claim 9, wherein the nodes of the append-only B+ tree further comprise a root node and index nodes.

11. The system of claim 9, wherein the index nodes comprise index entries that define how to index from the root node to the index nodes to the leaf nodes.

12. The system of claim 9, wherein the root node, the index nodes, and the leaf nodes are stored across distributed storage nodes.

13. The system of claim 9, wherein the operations further comprise:
    reading, in response to a determination that the target node data is stored in a cache, the target node data from the cache.

14. The system of claim 9, wherein the operations further comprise:
    reading the target node data from a target storage location of the target node data; and
    storing, in response to a determination that a difference between a layer of the B+ tree where the target leaf node is located and a layer where the root node of the B+ tree is located is less than a threshold number of layers, the target node data in a cache.

15. The system of claim 9, wherein the operations further comprise:
    reading the target node data from a target storage location of the target node data; and
    storing, in response to a determination that a number of reads of the target node data is greater than a threshold number, the target node data in a cache.

16. The system of claim 9, wherein the key is a first key, the target node data is a first target node data, the target leaf node is a first target leaf node, the location is a first location, the key-value pair is a first key-value pair, and wherein the operations further comprise:

receiving an update request comprising a second key and update data, wherein the second key is associated with second target node data stored in second target leaf node of the append-only B+ tree, and the update data applicable to a data update for the second target node data;

based on the node location information and the second key, identifying, using the respective offsets to perform another binary search of the single data block, a second location of a second key-value pair associated with the second target node data; and updating the second target node data using the update data.

17. A non-transitory computer-readable medium having instructions stored thereon that, in response to execution, cause a system comprising a processor to perform operations comprising:

generating a B+ tree structure for an append-only B+ tree, wherein the append-only B+ tree comprises nodes, wherein a subset of the nodes comprises leaf nodes that comprise data, the data comprising respective key-value pairs, and wherein the B+ tree structure comprises:

a single data block that comprises the key-value pairs respectively associated with the leaf nodes of the append-only B+ tree, and a node location information array that specifies respective offsets of locations of the key-value pairs in the single data block relative to a reference location of the single data block;

receiving a data read request for a data read, the data read request comprising a key associated with target node data stored in a target leaf node of the append-only B+ tree; and based on the node location information and the key, identifying using the respective offsets to perform a binary search of the single data block in a memory, a location of a key-value pair associated with the target node data.

18. The system of claim 17, wherein the nodes of the append-only B+ tree further comprise a root node and index nodes, and the index nodes comprise index entries that define how to index from the root node to the index nodes to the leaf nodes.

19. The system of claim 17, wherein the root node, the index nodes, and the leaf nodes are stored across distributed storage nodes.

20. The system of claim 17, wherein the key is a first key, the target node data is a first target node data, the target leaf node is a first target leaf node, the location is a first location, the key-value pair is a first key-value pair, and further comprising:

receiving an update request comprising a second key and update data, wherein the second key is associated with second target node data stored in second target leaf node of the append-only B+ tree, and the update data applicable to a data update for the second target node data;

based on the node location information and the second key, identifying, using the respective offsets to perform another binary search of the single data block, a second location of a second key-value pair associated with the second target node data; and updating the second target node data using the update data.

* * * * *